April 21, 1942.                M. L. EMERSON                2,280,750
                         FILM LIVE-FILING SYSTEM
                         Filed April 30, 1940         2 Sheets-Sheet 1

Inventor
MERTON L. EMERSON,

April 21, 1942.  M. L. EMERSON  2,280,750
FILM LIVE-FILING SYSTEM
Filed April 30, 1940  2 Sheets-Sheet 2
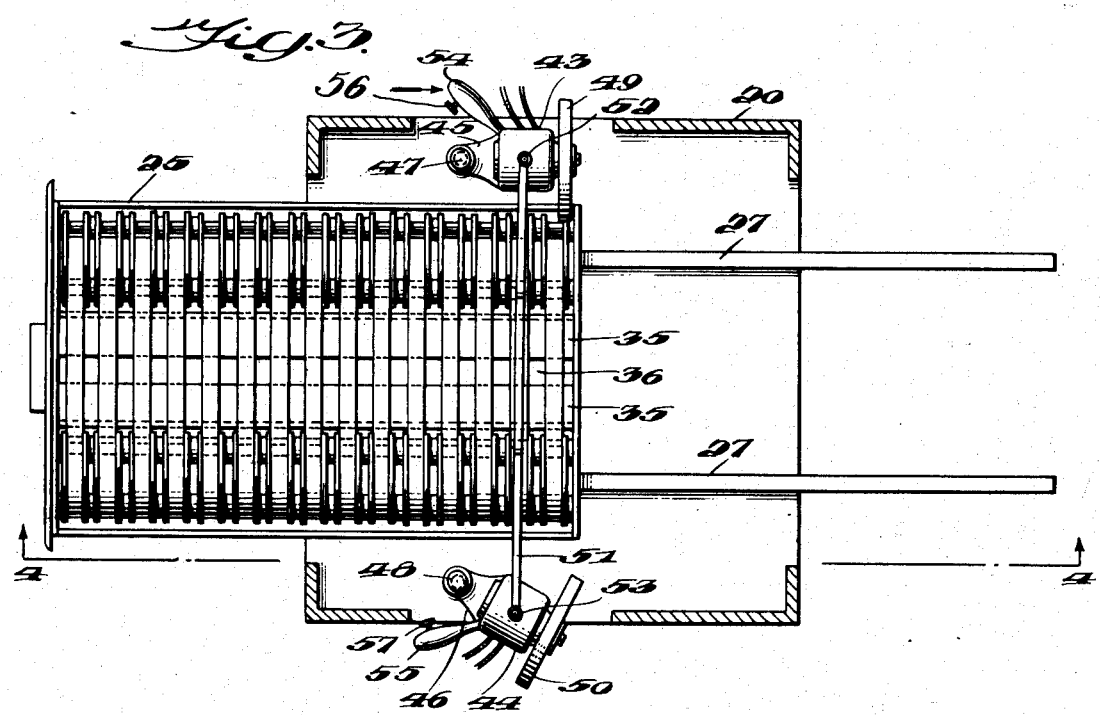
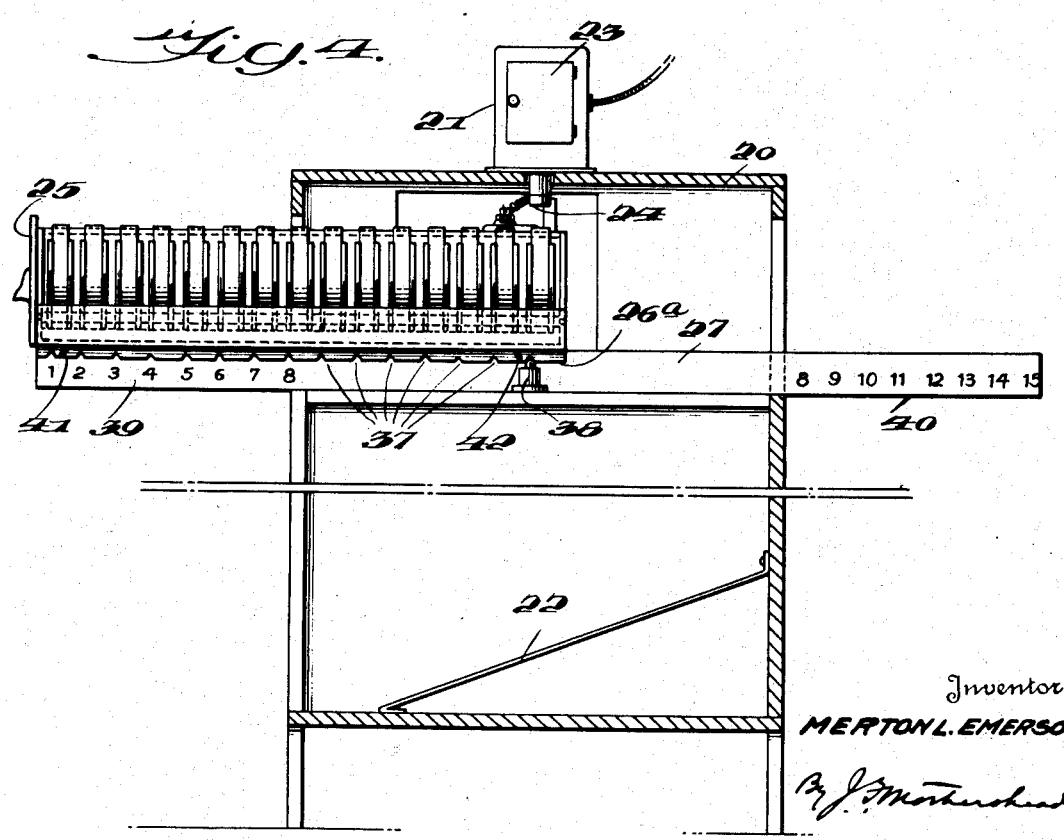
Inventor
MERTON L. EMERSON,
Attorney Patented Apr. 21, 1942

2,280,750

UNITED STATES PATENT OFFICE 2,280,750

FILM LIVE-FILING SYSTEM

Merton L. Emerson, Braintree, Mass.

Application April 30, 1940, Serial No. 332,615

16 Claims. (Cl. 88—24)

(Granted under the act of March 3, 1883, as amended April 30, 1928; 370 O. G. 757)

The invention herein disclosed may be used by the Government of the United States without the payment of any royalty therefor.

This invention relates to film storage and inspection, and aims generally to improve the same.

In the art of storing reference information on film records, so-called "micro-filming," the customary practice, after the records have been micro-filmed, as on 16 mm. safety film, is to place 4" diameter spools containing one hundred feet of film in pasteboard cartons, which in turn are put in drawers in a filing cabinet. To find a particular record, out of perhaps 2,000 on a 100 foot film, it is necessary to go to the file drawer, remove the carton, take the spool of film from the carton, unroll a lead length, put the spool into the viewing machine, thread the lead length into an empty spool, and then by a hand mechanism wind film on to the empty spool until the particular record of picture is located. After the desired use has been made of this picture or record the entire process must be reversed to get the spool of film back into its proper filing place. It will be seen, therefore, that while a record has been obtained on microfilm, this record is not easily available for ordinary operating conditions.

By the present invention, I am able to solve various ones of these several problems, severally and in various combinations, and to render such reference records much more available for use under normal and other operating conditions. In other words, by the customary practice, film records are so filed as to effectively be in dead-storage, as far as ready consultation is concerned; but by the present invention the film records themselves are made even more readily available for consultation than are current-files of correspondence and the like.

Particular objects and advantages of the invention, contributing to the major end above stated, as well as various novel features embodied therein, are illustrated in the following detailed description of a preferred embodiment exemplifying the invention, and shown in the accompanying drawings in which:

Fig. 3 is a horizontal section taken on the line 3—3 of Fig. 1, in the direction indicated by the arrows, and Fig. 4 is a vertical sectional view taken on the line 4—4 of Fig. 3, in the direction indicated by the arrows.

Figure 1:
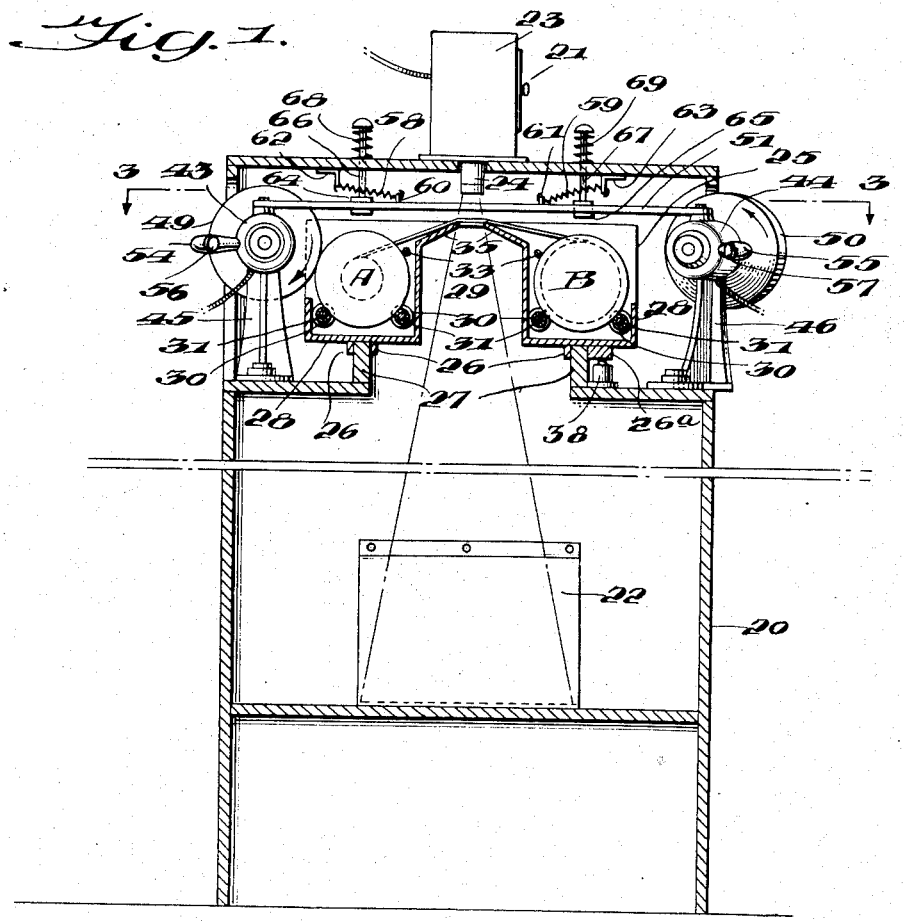
Fig. 1 is a vertical sectional view of a combined viewing machine and film "live-filing" means according to this invention.

Referring to the drawings, the illustrative embodiment shown comprises a support or base 20, which may be similar to the support or base of any usual or preferred form of film-viewer, carrying film viewing means, herein the light projector 21 and image screen 22, for exhibiting any selected frame or frames of any selected film among the large number made available for immediate reference in accordance with this invention. In the form shown the light projector 21 comprises a source of illumination, as the lamphouse 23 and condenser lens 24, for concentrating the light before its passage through the selected film record, but my invention is not limited to this particular form of viewer.

The filing devices or racks, per se, in accordance with my invention, preferably take the form of drawers 25, as shown, adapted to be movably received by the support or base 20, in co-operative relation to the film viewing means 21—22. For this purpose, in the illustrative embodiment the drawers 25 are provided with guide means, as the slide-members 26, 26a, adapted to cooperatively engage slide rails 27 carried by the support 20, to guide the drawer and properly position it. These guide means may, if desired, have dove-tail engagement, to enable shortening of the slide rails without danger of tilting of the rack 25.

The filing devices or racks 25 are provided with suitable multiple-film storage means for holding a plurality of films, fifteen in the embodiment shown, each mounted on a pair of reels or spools, A, B (Fig. 1), to be windable from one to the other, and to bridge across a space between the pair of spools thereby exhibiting frames of film in viewable position in said bridging portions. For ease of reference the two reels of each pair and the film connecting them, whether mounted in a supporting housing or not, will hereinafter be termed a record file.

The invention also contemplates the provision of means, preferably but not necessarily carried by the racks or drawers 25, for supporting the selected frame or film in viewing relation to the viewing means.

Referring to the embodiment disclosed in the drawings, the drawer or rack 25 comprises reception means for the several record files, herein in the form of two parallel mutually spaced film-reel receiving compartments 28, each provided with means for receiving one reel of the pair of each record file, with the connecting portion of the film bridging the space 29 between the compartments 28. In the simple form shown, where the record files are not individually housed, the compartments 28 are provided with means for supporting the reels for independent rotation, herein shown as reel rolls 30 mounted on pintles 31, near the bottom of each compartment 28. As in the form shown, the reel rolls 30 may be subdivided into sections having flanged ends, so that a reel may fit into each section and rotate that section on the pintle 31 without causing any positive rotation of the adjacent section. Anti-jump-out means may also be provided and in the form shown, comprises rolls or rods 33 which may be fixedly or removably inserted in the rack 25 in position to obstruct jumping out of the reels. These top rolls or rods 33 are shown in Fig. 1, but omitted from Figs. 2, 3 and 4 for clarity of illustration. The function of these anti-jump-out means may also be performed by the friction brake means hereinafter described.

Figure 2:
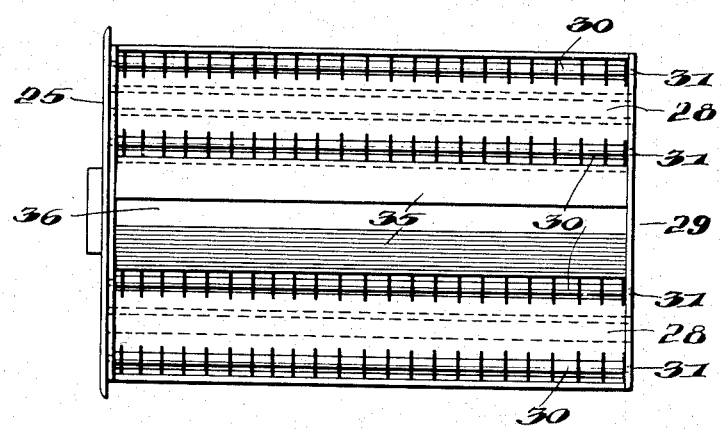
Fig. 2 is a plan view of one form of "live-filing" means.

While for clarity of illustration the record files A, B, are shown considerably separated in Figs. 1, 3 and 4, as by thick flanges or separating washers at the ends of subdivisions of reel rolls 30; as indicated in Fig. 2 illustrating a rack for twenty-two record files of say 2,000 frames each, i. e. 44,000 frames, each individual subdivision of the roll 30 may have very thin flanges on its ends to provide a minimum of waste space between adjacent films.

The means for supporting the selected film frame in predetermined position, in the form shown in the drawings, comprises the bridge member 35, having view presenting means, herein shown as projection aperture means in the form of a longitudinal slot 36, and in the form shown, the bridging means 35 is formed as a part of the drawer or rack 25, lying between the reel-receiving compartments 28. The film-contacting edge surfaces of the bridging member 35 may be provided with any usual or special form of anti-friction means, as anti-friction rollers or velvet, to avoid scratching of the film-record.

As shown in Figs. 1 and 4, the device of my invention may be provided with locating means for locating accurately any selected record-file with respect to the viewing means 21—22, that shown consisting of notches 37 formed in the slide-member 26a to cooperate with the spring-detent positioning means 38.

Means may also be provided for indicating to the operator which of the multiple record files is positioned in alignment with the viewing-means 21—22, such means being here shown as constituting index indicia 1 to 15 (Fig. 4), and suitable pointer means to point to the numeral thereof corresponding to the record-file aligned with the viewer means. In the illustrated embodiment, the indicia 1 to 8 and 8 to 15 are applied to the forwardly and rearwardly-extending ends 39 and 40 of one of the guide rails 27, and the pointer means consists of identifying markers 41, 42, shown of diamond shape in Fig. 4, carried by the cooperating slide-member (26a) and identifying the pertinent indicia number. Thus, in the relative position shown, marker 41 identifies record-file No. 1 (counting from the rear of the drawer) as aligned with the viewer 21—22, and as the drawer is moved rearwardly a step at a time, designates the alignment of record-files Nos. 2 to 8 respectively; while the identifying marker 42, as the drawer 25 emerges from the rear of the viewer on further motion, designates the alignment of record-files Nos. 8 to 15, respectively. The contents of the several record-files may of course be listed by a label on the front of the drawer 25, or in any other suitable manner.

My invention further contemplates means for bringing into viewing position the particular desired frame of film of any chosen record-file. This means in its broader aspect may be of any desired manual, semi-automatic, or fully automatic form, and in such aspect my invention is thus not limited to the particular semi-automatic form shown for purposes of illustration. In this form, the support 20 is provided with friction drive means, preferably interlocked for several operations only, by which the film of the record-file may be rapidly moved from one to the other of its reels until the approximate location of the desired frame is reached, after which it may be moved more slowly to bring the precise frame of film desired into viewing position.

The illustrative form of this device (Figs. 1 and 3) comprises a pair of electric driving motors 43, 44, movably mounted on the support 20, as by standards 45, 46 pivoted to the support at 47 and 48 respectively, and provided with friction drive rolls 49, 50, engageable with reels A and B respectively, of the selected record-file, for rotating the same to traverse the film across the bridging portion therebtween.

As above noted, the driving means units are preferably interlocked to be only severally engageable with the record-file, as by the tie rod 51 pivoted to the motor units as at 52 and 53.

Suitable speed-control means is provided. For instance, for this purpose reliance may be placed upon pressing the roll 49 or 50, and the cooperating friction brake 69 or 68 hereinafter described, more or less firmly against the reel A or B, respectively, although I prefer to employ a suitable positive motor start and stop and speed controlling means shown as embodied in the handles 54 and 55 of units 43 and 44 and operated by depressing to a greater or lesser extent the thumb-buttons 56 and 57 extending from said handles.

In addition, the driving-means, as is preferable in the form shown, may be provided with retraction means to insure retraction of the driving rolls 49 and 50 from the reels A, B, and to a position in which they will not interfere with movement of the drawer unit 25 to position a different record-file in consultable relation to the device. Such retraction means, in the form shown in Fig. 1, comprises a pair of tension springs 58, 59 stretched between lug means 60, 61 on the motor unit assembly, and herein on the tie rod 51, and companion lugs 62 and 63 on the support or base 20.

With the arrangement shown it will be apparent that by moving the drawer 25 to position the marker 41 or 42 adjacent the index number on the guide rail 27 corresponding to the desired record-file, a given film and reel assembly will be positioned in operative relation to the driving means and viewing system. Then by manipulation of 54—56 or 55—57 the rolls 49 or 50 may be engaged with the selected record-file to turn therein to the particular frame to be selected. When the desired frame has been viewed or copied, as the case may be, it is now not necessary to rewind the film, as is required by the customary method of film-filing, but the handles 54 and 55 can simply be released, whereupon the drawer 25 may be moved at once, or at will, to select another of the record-files, or to withdraw it from the machine to be replaced by another drawer 25 which may bodily be pulled out of a chest of such drawers and placed in the machine, without the necessity of handling any part of any film with consequent danger of damage.

By this invention it will thus be seen that a new method of filing and consulting film-records is accomplished, residing in the segregating of a multiplicity of such records into groups, as in interchangeable segregating means such as the drawer 25, handling such interchangeable groups bodily, and moving the individual record without removing it from the group.

Suitable means may also be provided, if needed in a particular arrangement, to avoid undue freedom of running of the reel from which film is being unwound during a frame selecting operation. While any usual or special means for this purpose may be employed, a friction means is preferred, and such a means is shown in Fig. 1, as comprising friction-brake pads 64, 65 carried by headed push-rods 66, 67 adapted to be manually or otherwise depressed to engage with the rim of reel B during motor driving of reel A, and vice versa, and which may be retracted by coil springs 68, 69 positioned between the heads of the push-rods and the top of the support or cabinet 20. When the friction-brake means is positioned generally as shown, it further serves as anti-jump out means, in which case the rolls or rods 33 may be omitted if desired.

As will be understood, any usual or special type of film holder may be associated with the bridge member 35 or view presenting means 36. In the form shown the function of a film frame holder may be performed, if and when necessary, by the combination of means 49—65 and 50—64, by maintaining the brake 64 or 65 tightly pressed against the reel A or B while maintaining slight tensioning contact of the friction roll 49 or 50 with the other reel, to hold the film frame tightly pressed against the view presenting means 36. Other forms of film frame holders, as a transparent or apertured plate adapted to be pressed against the film adjacent the view presenting means 36, either in the nature of a film-gate, or a presser plate lifted manually or automatically when the film is moved and pressed against the film while it is stationary, are well known in the art and may of course be employed with this invention.

From the foregoing description it will be apparent that the present invention effectively changes micro-film record filing from virtual dead storage to a current-file status, avoids all necessity for handling of films once stored, avoids necessity for useless rewinding of films after a consulation of a particular frame thereof, and contributes to the accurate and easy use of the micro-film record system, thereby saving time, wear and tear on the film, the machine and the operator and contributing to efficiency as well as saving of record filing space. It will also be seen that this invention, in the preferred form illustrated in the drawings, enables these ends to be accomplished in a system employing ordinary commercial films with their individual commercial film reels, and with similar individual companion reels, rendering it unnecessary to employ special film widths or to transfer film to any special film carrier and thus saving the expense of such carriers and the labor cost of transferrence, and avoiding the possibility of damage to the film during such transferrence.

The invention is not limited to the particular form disclosed for the purpose of illustrating one embodiment thereof.

I claim as my invention:

1. In a device of the class described, in combination, a support, film-viewing means carried by said support, said support having a rack-receiving space, a rack carrying a group of independently rotatable pairs of film spools mounted in relatively fixed special positions therein, each pair having a film-record mounted thereon and bridging therebetween, said film-viewing means and rack being relatively movable to bring into viewing position a selected one of said grouped film-records, means for positioning the bridging portion of the selected film record in viewing relation to said film-viewing means, and means for moving the selected film-record only from one to the other of its pair of spools for positioning in viewing relation a particular frame to be viewed.

2. A film live-filing and viewing means comprising a support carrying a film viewer, a rack removable from said support, a plurality of separate film records, a pair of spools carrying each film record, said pairs of spools being mounted in relatively fixed spacial positions in said rack, each individual film-record being attached to both of the spools of its pair and presenting frames to be viewed in the portion bridging from one spool to the other, means for adjustably associating said rack with said support for locating any selected film record of the movable group in viewing relation to said film viewer, and means for selectively driving the spools of the selected film record independently with respect to the other pairs in the rack to present in viewing position different frames of the selected film record mounted thereon.

3. In a device of the class described, a film viewer comprising a support, a movable rack and a single-film viewing device carried by said support, said rack carrying in relatively fixed special positions therein a plurality of independent pairs of film-record spools having film-records attached to the spools of the respective pairs and bridging therebetween, means for relatively positioning said rack and viewing device to position in viewing relation to said single film viewing device any selected one of said film records, and means for moving the selected film record only from either of its spools to the other to move the film thereon in either direction to position in viewable relation to said single film viewing device any desired frame of said film record.

4. In a system of the class described, a plurality of interchangeable racks each carrying a plurality of independent pairs of film-record spools having film-records attached to the spools of the respective pairs and bridging therebetween, a film viewer comprising a support and a single-film viewing device carried thereby, said support having means for receiving bodily any selected one of said interchangeable racks and means for relatively positioning said rack and viewing device to position in viewing relation thereto any chosen one of the film-records stored therein, and means for moving the chosen film-record only in either direction to present in viewing relation to said device any desired frame thereof.

5. Means for consultably filing a multiplicity of film-records each including a multiplicity of individual record frames, comprising a plurality of interchangeable racks each carrying a segregated group of said film-records; each film-record of the group comprising a relatively narrow film mounted on its own individual pair of reels and presenting a consultable portion bridging therebetween, and each pair of reels being drivable independently of the others; a film viewer comprising viewing means and a support for receiving bodily any selected one of said interchangeable racks, said film viewer comprising means providing for relative movement between said selected rack and said viewing means to position in viewing relation the consultable portion of any chosen one of the film-records carried therein, and means for driving the reels of the chosen film-record independently of the other records of the group to present the desired frame thereof in its consultable portion while maintaining the film-record in place in the rack with the other undriven film records therein.

6. A multiple film filing and presenting means of the class described, comprising a filing cabinet drawer, said drawer comprising three parallel longitudinal sections, said drawer having light aperture means extending longitudinally of the central one of said longitudinal sections, and said drawer having film reel supporting means in each of its side sections adapted to rotatably support therein a plurality of relatively narrow film reels having their axes extending parallel to said aperture means and similarly spaced longitudinally along said sections to form complementary pairs for independently carrying and reeling and unreeling relatively narrow multi-frame films extending across said aperture means.

7. A multiple film filing and presenting means of the class described, comprising a filing cabinet drawer, said drawer comprising three parallel longitudinal sections, said drawer having light aperture means extending longitudinally of the central one of said sections, a plurality of relatively narrow film reels having their axes extending parallel to said aperture means and independently rotatably mounted in one of the side sections of said drawer, a plurality of similar reels similarly arranged in the other of said side sections in positions complementary to said first named reels, and a plurality of relatively narrow multi-frame film records, independently mounted on respectively complementary reels and extending across said aperture means, whereby each of said films may be driven independently of the others to present any desired one of its frames in juxtaposition to said aperture means, while maintaining said film and its associated reels in place in said drawer.

8. In combination, a film filing and presenting means according to claim 7 and a film viewer having a light projector, and having means for bodily supporting said drawer for longitudinal movement relative to said projector to position any selected film extending across said aperture means in alignment with said projector while maintaining said film and its associated reels in place in said drawer.

9. In combination, a film-filing and presenting means according to claim 7, and a film viewer having a light projector, means for bodily supporting said drawer for longitudinal movement relative to said projector to position any selected film extending across said aperture means in alignment with said projector, and means for moving the selected film from one to the other of its associated reels to present any desired frame thereof in alignment with said projector while maintaining said film and its associated reels in place in said drawer.

10. A film live-filing system employing a viewing device, and comprising a multiplicity of individually reversibly drivable film strips assembled into storage units of an easily handleable size each comprising a considerable number of the individually drivable film strips; each film in each unit exhibiting a changeable consultable position; the respective storage units being bodily movable to position any selected one of the films therein, in place in the unit, in viewing relation to said viewing device; and the respective films in said units being capable of being left in their last consulted positions during bodily movement of the units to and from storage and during consultation of desired frames of other films in the respective units.

11. A film live filing system according to claim 10; said storage units being in the form of interchangeable racks; a frame carrying said viewing device and formed to interchangeably mount any one of said racks, said racks and said viewing device being relatively movable in said frame to mutually align said viewing device and any one of the independently drivable films in any one of said racks.

12. A film live-filing system according to claim 10; said storage units being in the form of racks having drawer fronts thereon and adapted to be slid into file-cabinet like housings; a frame carrying said viewing device and formed to interchangeably mount any one of said racks, said racks and said viewing device being relatively movable in said frame to mutually align said viewing device and any one of the independently drivable films in any one of said racks.

13. A film live-filing system according to claim 10; said individually reversibly drivable filmstrips being in the form of relatively narrow multi-frame films each mounted on its own individual pair of film spools; and said storage units being generally drawer-like in form, having light aperture means extending centrally and longitudinally thereof, and formed to rotatably receive the spools of each pair in complementary relation on opposite sides of said aperture means, with the bridging portion of each film extending across said light aperture means.

14. A film live-filing system according to claim 10, said individually reversibly drivable film-strips being in the form of relatively narrow multi-frame films each mounted on its own individual pair of film spools, and said storage unit being formed to rotatably receive the spools of said pairs in complementary positions in two axially aligned rows with edges of said spools exposed; and said viewing device being provided with means selectively engageable with an edge of any desired spool to move any desired frame thereof into consultable relation to said viewing device.

15. A film live-filing system according to claim 10, said individually reversibly drivable film-strips being in the form of relatively narrow multi-frame films each mounted on its own individual pair of film spools, and said storage unit being formed with two parallel mutually spaced compartments and having means for independently rotatably holding said film spools in relatively fixed spacial relation in each of said compartments with the spools of each pair respectively positioned in alignment with one another in said respective compartments and with the film-strips bridging across the space therebetween, said rack being formed between said two compartments to provide for the passage of light through the bridging portions of said films.

16. A film live-filing system according to claim 10, said individually reversibly drivable film-strips being in the form of relatively narrow multi-frame films each mounted on its own individual pair of film spools, and said storage unit being formed with two parallel mutually spaced compartments and having means for independently rotatably holding said film spools in relatively fixed spacial relation in each of said compartments with the spools of each pair respectively positioned in alignment with one another in said respective compartments and with the film-strips bridging across the space therebetween, said rack being formed between said two compartments to provide for the passage of light through the bridging portions of said films, and said means for holding said film spools comprising at least two roller rods subdivided into individual film spool supporting rollers.

MERTON L. EMERSON.